United States Patent [19]

Edamoto

[11] 4,113,501

[45] Sep. 12, 1978

[54] TEMPORARY SEALANT OF A NOZZLE OPENING OF SLIDING NOZZLE

[76] Inventor: Yoshito Edamoto, No. 3515, Totsuka-cho, Totsuka-ku, Yokohama-shi, Kanagawa-ken, Japan

[21] Appl. No.: 819,707

[22] Filed: Jul. 28, 1977

[51] Int. Cl.$^2$ ............................................. C04B 35/52
[52] U.S. Cl. ........................................ 106/56; 106/65; 106/66; 106/58; 106/69; 106/193 J; 106/214; 222/590; 260/42.14; 106/281 R
[58] Field of Search .................. 106/56, 58, 66, 65, 106/69, 193, 214, 281; 266/45; 222/590, 591, 597; 260/42.14

[56] References Cited

U.S. PATENT DOCUMENTS

| 3,329,514 | 7/1967 | Saunders et al. | 106/56 |
| 3,775,140 | 11/1973 | Visser et al. | 106/56 |
| 4,022,739 | 5/1977 | Bove | 106/56 |

*Primary Examiner*—Winston A. Douglas
*Assistant Examiner*—J. V. Howard
*Attorney, Agent, or Firm*—Fay & Sharpe

[57] ABSTRACT

A temporary sealant of a nozzle opening of sliding nozzle, which is in the form of either coarse particle or molding and which consists of 92.0 to 98.8% by weight of a non-porous refractory material having a particle size distribution of more than 95% of approximately particle diameter 2.0 – 0.8 mm, 1 to 5% by weight of a carbonaceous material having particle size of less than 0.15 mm, and 0.2 to 3.0% by weight of an organic tackifier.

6 Claims, No Drawings

TEMPORARY SEALANT OF A NOZZLE OPENING OF SLIDING NOZZLE

The present invention relates to an improvement in a temporary sealant of a nozzle opening for preventing the nozzle opening from blocking-up caused by a solidification of melt, which occurs in said nozzle opening at the initial period of pouring, when melt is poured in molten metal vessel such as ladle or tundish by using sliding nozzle or rotary nozzle.

Conventionally, in molten metal vessel having sliding nozzle is subject to a melt in a state where nozzle opening is closed, but there is a disadvantage that at that time the melt enters into an upper nozzle opening, the melt is cooled from the periphery of the upper nozzle so as to be solidified, and the nozzle opening is blocked up.

To consider a counterplan thereagainst there are means of preheating the nozzle opening before the pouring of melt into the vessel or making an opening by blowing oxygen to the nozzle portion at the initial period of melt pouring, but there will take place a trouble of nozzle sliding apparatus, which is caused by overheat due to quick heating of the nozzle, an elongation of waiting time for melt pouring, a melting loss of the nozzle opening because of oxygen, an operation danger and the like. There is another means of making the melt not remain in the nozzle opening by filling said opening with sand or the like alone. In such a case, however, the filler of sand or the like may build a sintered body by the heat of the melt so that the melt discharge at an early stage may not necessarily be carried out smoothly.

The object of the present invention is to produce a composition as filler into nozzle opening, which prevents the melt from entering into the nozzle opening and easily comes off through the pressure of the melt when the sliding nozzle is opened, to make a smooth pouring of the melt. That is, the invention relates to temporary sealants of nozzle opening of a sliding nozzle, which sealants consisting of 92.0 to 98.8% by weight of a non-porous refractory material having a particle size distribution of more than 95% of approximately particle diameter 2.0 - 0.8 mm, 1 to 5% by weight of a carbonaceous material having particle size below 0.15 mm, and 0.2 to 3.0% by weight of an organic tackifier. When the periphery of coarse-particled refractory material is coated with carbonaceous material with an organic tackifier and the refractory material is charged into nozzle opening so as to pour melt into the vessel, there does not occur any trouble that the nozzle opening is blocked up by the sintering of sealant, because the carbonaceous material continues gradually to be oxidized and burned to interpose between the refractory particles, thereby avoiding a sintering of the refractory particles. Only mixture of a refractory material with a carbonaceous material may be incapable of completely coating the surface of the refractory material, but the coating layer can be ensured approximately constant by a tackifier. As the refractory material used in the invention there can be mentioned siliceous sand, peridotite, brick powder, bauxite, alumina, chromite, magnesia, dolomite, magnesiste, spinel and the like, which have high refractoriness. The particle size of the refractory materials would preferably be of 2.0 to 0.8 mm particle diameter. Particles greater than 2.0 mm may have greater interparticle voids to bring about a fear of entry of melt between the voids. On the other hand, particles less than 0.8 mm may have greater surface areas so that they require greater amounts of the carbonaceous material as coating agent and the organic tackifier, raising a collapsibility when heated and generating an unnecessarily high decomposition rate when contacting the melt. Thus there is a fear that the refractory material is collapsed before the nozzle bricks are heated enough so that the nozzle opening is exposed and melt enters into the opening to be solidified there. Ideally there should not exist particles other than 2.0 to 0.8 mm but industrially mixing of particles other than said range is inevitable. As a permissible range, an insurance of more than 95% particles within said range will ensure the use of the sealant. In mixing proportion of refractory material, partiality of the refractory toward greater particle size may require a large mixing ratio of the refractory but the reverse case may require a small mixing ratio. With less than 92% a collapsibility will be accelerated when heating, thereby causing the same defect as in the execess of said carbonaceous material and organic tackifier.

As carbonaceous materials there are preferably mentioned graphite, coke, soot, charcoal, semi-coke, anthracite and the like which have a great free carbon content and the least possible volatile ingredients, the volatile ingredients being not preferable because of promoting collapsibility. Referring to the particle size of the carbonaceous material, the finer the better in consideration of coating the refractory material, but practically it can be used if it is less than 0.15 mm. In the mixing proportion of the carbonaceous material, less than 1% will not be sufficient to coat, and more than 5% may accelerate the collapse of the sealant when heated, so that these two cases are unsuitable.

Further, as tackifiers of adhering carbonaceous material to refractory material there may be preferably used organic ones which do not form a sintered body, and inorganic stackifier as water glass is not suitable. Among the organic tackifiers there are carbohydrates such as starch, dextrin, sugar and mannan; vegetable mucilage such as tragacanth gum, gum arabi and hibiscus; protein such as glue, gelatin and casein; polyvinylates such as carboxymethylcellulose, sodium polyacrylate and polyacrylic amide; thermoplastic resins such as polyvinyl alcohol, polyethylene, polypropylene, nylon, polycarbonate, polystyrene and fluorine resin; thermosetting resins such as phenol resin, urea resin, melamine resin, polyester resin and epoxy resin; cold-setting resins such as furan resin, Japanese lacquer (rhus lacquer), unsaturated polyester resin and vinylester resin; mineral oils such as pitch, asphalt, tar and heavy oil; caking coals of bituminous coal such as gas coal and coke coal; and animal and plant drying oils such as linseed oil, tung oil, perilla oil, fish oil and boiled oil; these materials having an adhesiveness at normal temperature or when heated. Being thermally decomposable, it is preferable to mix them as small as possible, but its mixing of less than 0.2% is not endurable in use in view of adhesive performance and an excess use of more than 3.0% may quicken the collapsibility of the sealant when it is heated so that it is unsuitable.

In preparing the sealant according to the present invention, a predetermined amount of mixing materials are mixed, and the tackifier in a liquid state may be added as it is but the tackifier in a soluble state may be added in a liquid state by solving it into a solvent or a solvent may be added in the course of mixing the sealant materials. Furthermore, it is desirable that thermo-softening tackifiers such as resins are heated as they are to adhere the mixing materials and that high temperature softening tackifiers such as caking coal and fluorine resin are blended with other low temperature softening ones. As regards cold-setting resins, a hardener may be added preferably near the end of mixing. Sealant thus mixed may be moulded in a predetermined shape, thereafter either solidifying and drying it through heating or other means, or heating it to remove solvent if it exists and then roughly crushing it into a size of less than 5 mm. In the case of coarse particles, those of more than 5 mm may hardly adhere when filled in the nozzle opening.

Molded sealants are inserted into the upper portion of nozzle opening of a closed sliding nozzle and pressed in such an extent that they may not come out, and those in coarse particles are thrusted in for filling. Even if melt vessel is preheated, the sealants are not subject to substantial damage at a temperature of such degree. When melt is poured into a vessel the sealants are gradually consumed from their upper portion according to the burning of the carbonaceous material, and the refractory material comes off and floats up. Since the sealants are of good heat conductivity at the portion where the refractory material came off, the upper portion of the nozzle is not solidified with melt because said upper portion is sufficiently heated with the heat of said melt, whereby bringing about no blocking up of the nozzle. Thus when melt is discharged by slidably opening the lower portion of the nozzle, the remaining sealants of the nozzle opening are pushed out under melt pressure and the melt flows out without any trouble.

The following examples illustrate the present invention but not to be construed as limiting the scope of the invention.

| Mixing Example (in terms of dried materials) | | No. 1 | No. 2 | No. 3 | No. 4 |
|---|---|---|---|---|---|
| Siliceous sand | (%) | 92.0 | — | — | 30.8 |
| Peridotite | (%) | — | 94.0 | — | 35.0 |
| Alumina | (%) | — | — | 96.3 | 33.0 |
| Graphite | (%) | 3.0 | — | 1.9 | 1.0 |
| Charcoal | (%) | 2.0 | 3.5 | — | — |
| Phenol resin | (%) | 2.0 | 1.0 | 1.8 | 0.2 |
| Pitch | (%) | 1.0 | 1.5 | — | — |

EXAMPLE 100 ton ladle; Upper nozzle opening: 60 mm$\phi$ × 160 mm in depth

In a closed state of nozzle said mixture in molding and said mixture in coarse particle were respectively charged into eight ladles, the ladles were preheated up to about 400° C, and then molten steel was poured thereinto, when the temperature of the molten steel was between 1600° and 1650° C.

Upon slidably opening the lower sliding nozzle in 5 minutes as waiting time from melt pouring to discharge, the molten steel immediately started to flow out in both the cases and there was not noticed any blocking of the nozzle.

What is claimed is:

1. A composition adapted to be used as a temporary sealant in a nozzle opening which consists essentially of 92.0 to 98.8% by weight of at least one non-porous refractory material selected from the group consisting of siliceous sand, peridotite, chamotte, brick powder, bauxite, alumina, chromite, magnesia, dolomite, magnesite and spinel, said refractory material having a particle size distribution of more than 95% of said particles having a diameter ranging from 0.8 to 2.0 mm; 1 to 5% by weight of at least one carbonaceous material selected from the group consisting of graphite, coke, soot, charcoal, semi-coke and anthracite, said carbonaceous material having a particle size of less than 0.15 mm; and 0.2 to 3.0% by weight of at least one organic tackifier selected from the group consisting of starch, dextrin, sugar, mennan, algae starch, vegetable mucilage, glue, carboxy-methylcellulose, polyvinylates, polyvinyl alcohol, thermo-plastic resins, thermo-setting resins, cold-setting resins, pitch, asphalt, tar, heavy oil, caking coal, animal and plant drying oils.

2. The composition of claim 1 wherein said refractory particles are coated with said carbonaceous particles which are bonded thereto by said tackifier.

3. A method of producing a composition adapted to be used as a temporary sealant in a nozzle opening including the steps of:
   coating particles of a refractory material selected from the group consisting of siliceous sand, peridotite, chamotte, brick powder, bauxite, alumina, chromite, magnesia, dolomite, magnesite and spinel, said refractory material having a particle size distribution of more than 95% of said particles having a diameter ranging from 0.8 to 2.0 mm with at least one carbonaceous material selected from the group consisting of graphite, coke, soot, charcoal, semi-coke and anthracite, said carbonaceous material having a particle size of less than 0.15 mm; and
   forming the resultant mixture into the desired shape.

4. The method of claim 3 wherein said resultant mixture is crushed to a size of less than 5 mm.

5. The method of claim 3 wherein a tackifier selected from the group consisting of starch, dextrin, sugar, mannan, algae starch, vegetable mucilage, glue, carboxy-methylcellulose, polyvinylates, polyvinyl alcohol, thermo-plastic resins, thermo-setting resins, cold-setting resins, pitch, asphalt, tar, heavy oil, caking coal, animal and plant drying oils is employed to cause said carbonaceous particles to adhere to the surface of said refractory particles.

6. A method of temporarily sealing a nozzle opening in a vessel adapted to contain molten metal comprising:
   (a) placing in the nozzle being sealed so as to close the passage therethrough a sealant which consists essentially of 92.0 to 98.8% by weight of at least one non-porous refractory material selected from the group consisting of siliceous sand, peridotite, chamotte, brick powder, bauxite, alumina, chromite, magnesia, dolomite, magnesite and spinel, said refractory material having a particle size distribution of more than 95% of said particles having a diameter ranging from 0.8 to 2.0 mm; 1 to 5% by weight of at least one carbonaceous material selected from the group consisting of graphite, coke, soot, charcoal, smi-coke and anthracite, said carbonaceous material having a particle size of less than 0.15 mm; and 0.2 to 3.0% by weight of at least one organic tackifier selected from the group consisting of starch, dextrin, sugar, mennan, algae starch, vegetable mucilage, glue, carboxy-methylcellulose, polyvinylates, polyvinyl alcohol, thermo-plastic resins, thermo-setting resins, cold-setting resins, pitch, asphalt, tar, heavy oil, caking coal, animal and plant drying oils;
   (b) placing molten metal in said vessel in contact with at least a portion of said sealant; and
   (c) permitting said molten metal to cause said carbonaceous particles to burn and subsequently open the passage in said nozzle.

* * * * *